United States Patent [19]

Bonnerot

[11] 4,281,408

[45] Jul. 28, 1981

[54] DIGITAL SIGNAL PROCESSING ARRANGEMENT FOR CONTROLLING THE LEVEL OF A FREQUENCY-DIVISION MULTIPLEX SIGNAL

[75] Inventor: Georges Bonnerot, Les Ulis, France

[73] Assignee: U.S. Philips Corporation, New York, N.Y.

[21] Appl. No.: 41,032

[22] Filed: May 21, 1979

[30] Foreign Application Priority Data

Jun. 8, 1978 [FR] France .................. 78 17126

[51] Int. Cl.³ .............................................. H04J 1/05
[52] U.S. Cl. ...................................... 370/70; 370/74
[58] Field of Search ................... 370/74, 76, 70, 69

[56] References Cited

U.S. PATENT DOCUMENTS

| 4,009,350 | 2/1977 | Cabet ....................................... 370/74 |
| 4,103,110 | 7/1978 | Picquendar ............................ 370/70 |

*Primary Examiner*—David L. Stewart

*Attorney, Agent, or Firm*—Thomas A. Briody; William J. Streeter; Laurence A. Wright

[57] ABSTRACT

Level control arrangement for frequency-division multiplex signals, comprising an amplifying device having a variable gain factor, a circuit for transposing the frequency of the multiplex signal at the output of said arrangement in order to bring the frequency of the pilot signal to a low frequency; a low-pass filter for limiting the spectrum of the transposed signal; and analog-to-digital converter in the form of a uniform delta modulator, the input whereof is connected to the output of the low-pass filter. In a code converter this delta modulation signal is converted into either a PCM signal, or a DPCM signal, and the signal thus obtained is applied to a digital filter for selecting a signal which is characteristic of said pilot signal. The filtered signal is applied to a detector for detecting the peak values. The peak values obtained are applied to a comparison device for generating an error signal which sets the value of the gain factor of the amplifying device.

2 Claims, 3 Drawing Figures

DIGITAL SIGNAL PROCESSING ARRANGEMENT FOR CONTROLLING THE LEVEL OF A FREQUENCY-DIVISION MULTIPLEX SIGNAL

BACKGROUND OF THE INVENTION

The invention relates to a level control arrangement for controlling the level of a frequencydivision multiplex signal.

Level control arrangements are inter alia used in carrier telephony systems. In such a system a plurality of telephone signals are transmitted, in a FDM-format, from a transmitter to a receiver via a transmission medium, frequently a transmission cable.

As a cable attenuates the signals propagating through it, the level of the FDM signal decreases, namely by a certain amount per kilometer. This means that when the transmitter and receiver are situated at a very great distance from one another, for example, some thousands of kilometers, the level of the FDM-signal will be much too low on receipt by the receiver. To obviate this, repeater stations are arranged in the transmission cable at regular distances to amplify the level of the FDM-signal, entering the repeater, to a predetermined value. The cable attenuation is not a constant quantity because it depends on a number of external factors. In order to determine the amount of change of the signal level occurring between two consecutive repeater stations, a pilot signal is transmitted with the FDM-signal with a certain fixed frequency and with a level which is accurately known at the moment this pilot signal is added to the FDM-signal.

If, now more particularly, the FDM-signal is formed by a so-called primary FDM group, then this FDM-signal comprises 12 telephone signals, each having a bandwidth of 4 kHz and this group of 12 telephone signals is then located in the frequency band from 60 to 108 kHz inclusive. For such a primary FDM group the above mentioned pilot signal has a frequency of 84.140 kHz.

In order to amplify in such a repeater station the level of the incoming FDM signal to the desired level, it is known to provide the level control arrangement with a pilot filter for selecting the pilot signal, to compare the level of the pilot signal thus obtained with a fixed reference level, to generate a signal which is a measure of the difference between the two levels and to set with last-mentioned signal the gain factor of an amplifier having an adjustable gain factor. In case the FDM signal consists of a primary FDM group, said pilot filter must be formed by means of a bandpass filter having a bandwidth of approximately 20 Hz and an intermediate frequency of approximately 84.140 kHz. It is, however, very difficult and, consequently, very expensive to produce a filter which satisfies these requirements.

To diminish the difficulties in making the pilot filter it is known from French Pat. No. 2,287,811, which corresponds to U.S. Pat. No. 4,009,350, to use a level control arrangement comprising a transposition circuit to which the FDM signal is applied and by means of which this signal is transposed to a lower frequency band, in such a way that, for example, the pilot signal of the primary FDM group is converted into a 140 Hz signal. The transposed FDM signal thus obtained is passed on to a low-pass filter.

The output signal of said low-pass filter usually comprises, in addition to the above-mentioned, desired 140 Hz signal, a plurality of signalling signals which are also comprised in a FDM signal and whose frequencies are near to those of this pilot signal. In the case of the so-called d.c. signalling a very strong direct current component occurs in the output signal of the low-pass filter as well as signals having a frequency of 10 Hz and multiples thereof. It should be noted that the amplitude of these signals decreases to a very great extent at higher frequencies.

In order to select the desired 140 Hz signal from this output signal of the low-pass filter, the above-mentioned French Patent Specification proposes to apply this output signal to a PCM coder to which sampling pulses are applied which occur with a frequency of 4 kHz. The digital signal produced at the output of this PCM coder is thereafter applied to a digital bandpass filter which, albeit in digital form, produces the desired 140 Hz signal. This digital 140 Hz signal is thereafter also applied to a digital comparison circuit wherein the level of this digital 140 Hz signal is compared with a reference level. As the digital output signal of the PCM coder does not only comprise a digital version of the desired 140 Hz signal but also digital versions of the signalling signals, the digital bandpass filter must be a narrow-band filter. This implies that a large number of arithmetical operations must be performed in this filter to obtain one output code word.

The use of the level control arrangement described in the above-mentioned French Patent Specification is only economically justified if the PCM coder can be utilized in time-division multiplex for each one out of a greater number of FDM signals, for example, for 50 primary FDM groups. To enable the use of a PCM coder for such a greater number of primary groups, extremely high demands must be made on the components from which this coder is implemented, as the conversion rate must be very high. The use of one single PCM coder for several mutually independent signals results practice always in cross-talk.

SUMMARY OF THE INVENTION

It is an object of the invention to provide a level control arrangement which can be realized in an economically justified manner for individual use for each primary FDM group, so that no cross-talk occurs between FDM groups.

The level control arrangement of the type described in the above-mentioned French Patent Specification and arranged for controlling the level of a frequency-division multiplex signal which includes a pilot signal, the control arrangement comprising in general:
an amplifier having an adjustable gain factor and comprising means for receiving a setting signal,
setting signal-generating means coupled to the output of said amplifier and comprising:
 = frequency transposition means;
 = a low-pass filter which has its input coupled to the output of the frequency transposition means;
 = converting means for converting an analog signal into a digital signal the input whereof is connected to the output of said low-pass filter;
 = digital filter means the input whereof is connected to the output of the converting means for generating a digital output signal which is characteristic of said pilot signal;
 = means for coupling the output of the digital filter means to the setting signal receiving means of the amplifier;

is characterized in accordance with the invention in that said converting means comprise:

a delta modulator for generating a delta-modulation signal, the delta modulator being controlled by sampling pulses occurring with a sampling rate Fe and which has its input connected to the output of the low-pass filter;

means for converting the delta-modulation signal into permuted signal (that is to say a PCM or DPCM signal) the code words whereof occur with a rate $F_e/2^n$, wherein n represents an integer.

The invention is based on the notion that d.c. signals can not be transmitted by means of a delta modulator. This results in that the above-mentioned signalling signals, having frequencies of 0 Hz and multiples of 10 Hz are very much attenuated by this delta modulator. The digital filter can therefore be of a simpler implementation. In addition, a level control arrangement has now been realized with a particularly simple version of an analog-to-digital converter. If the FDM signal is formed by a primary FDM group, a uniform delta modulator will even be sufficient. In that case the means for converting the delta modulation signal into the permuted signal can be constituted by an accumulator whose content is read at a rate $F_e/2^n$. Should this permuted signal be a DPCM signal, the accumulator must be read destructively, should this permuted signal be a PCM signal, however, the accumulator must be read non-destructively.

DESCRIPTION OF THE DRAWINGS

The invention will now be further explained by way of non-limitative example with reference to the accompanying Figures.

DESCRIPTION OF THE PREFERRED EMBODIMENTS

Figure 1:
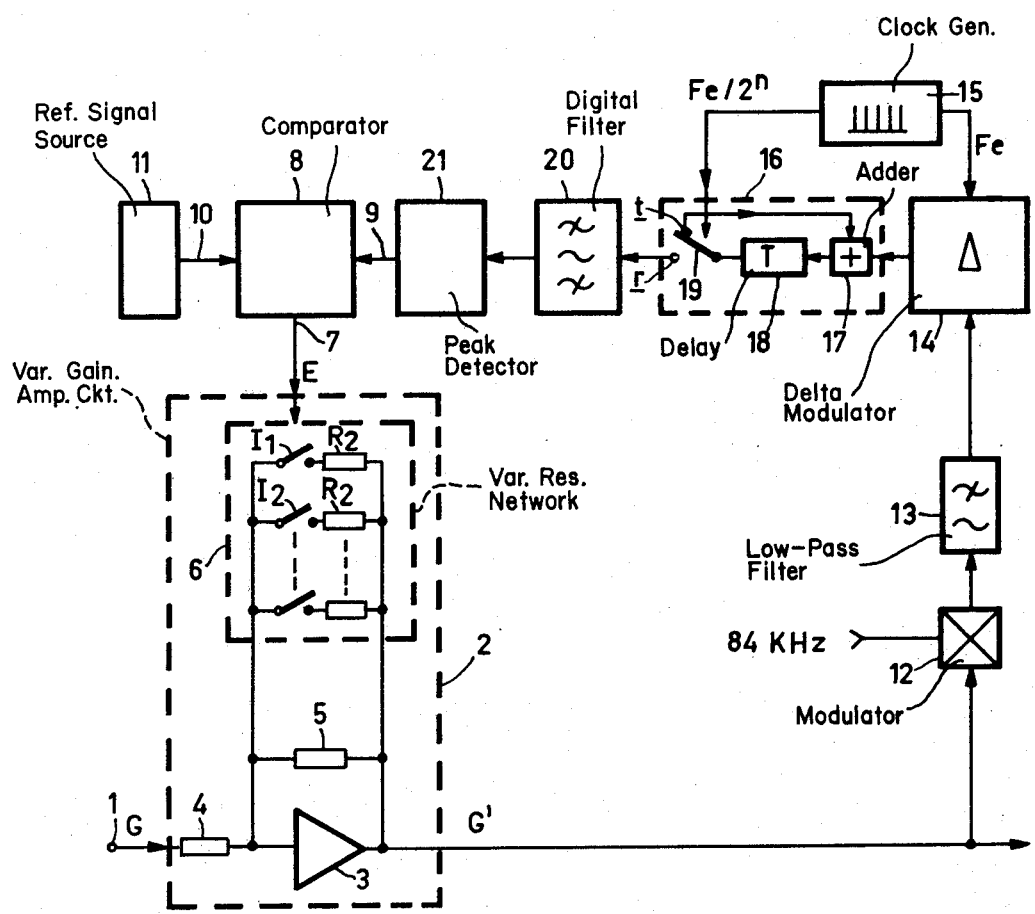
FIG. 1 shows schematically the level control arrangement according to the invention.

The level control arrangement shown in FIG. 1 is arranged for controlling the level of a primary FDM group. This primary FDM group, which is applied to this control arrangement via the input 1 is formed by 12 speech signals and occupies the FDM-frequency band 60-108 kHz. In addition to speech signals this FDM group comprises a pilot signal located in the center of the FDM frequency band in an interval located between two consecutive channel signals. As mentioned above this pilot signal has a frequency of 84.140 kHz. As remarked above, a primary FDM group comprises a plurality of signalling signals each associated with a channel signal. If a so-called d.c. signalling is used, a signal having a very high level occurs in the frequency interval in which the pilot signal is located and with the frequency of 84 kHz, as well as several other signals, the signal having the highest level having a frequency which deviates 10 Hz from 84 kHz, whereas the other signals have frequencies which deviate from 84 kHz by multiples of 10 Hz.

The received primary FDM group G is applied to an amplifier device 2 having a variable gain factor. This amplifier device 2 includes an amplifier 3 which comprises an input resistor 4, a fixed negative feedback resistor 5 and a network 6 having a variable resistor arranged in parallel with the resistor 5. The network 6 consists of a certain number of resistors $R_1$, $R_2$ etc., which can be connected to the terminals of the resistor 5 by means of switches, shown symbolically only, $I_1$, $I_2$ etc. These switches are controlled by a setting signal E.

The gain of the device 2 must be automatically set to compensate for the level changes to which the received primary FDM group G has been subjected, so that this device produces a signal G' having a predetermined level. To this end the output signal G' of the device 2 is applied to a level control arrangement comprising means for selecting the pilot signals from the FDM signal G' and arranged for generating a level signal which is characteristic of the level of the pilot signal. This level signal is compared in a comparison device 8 with a reference level signal and this comparison device 8 supplies an error signal which is applied to the amplifying device 2 as the setting signal E. The reference level signal is generated by a reference signal source 11.

Figure 2:
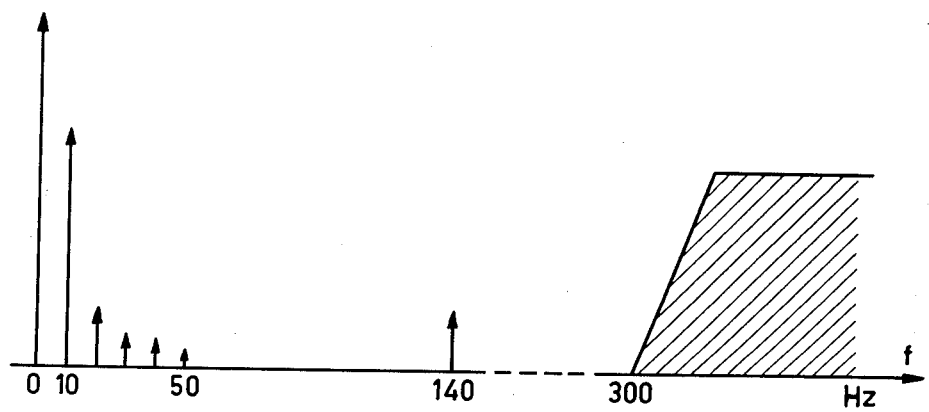
FIG. 2 shows the spectrum of the frequency-transposed primary FDM group.

For generating said level signal the arrangement shown in FIG. 1 comprises a modulator 12, to which the output signal G' of the amplifying device 2 is applied as well as a carrier signal having a frequency of 84 kHz. In the output signal of this modulator 12 the original 84.140 kHz signal now emerges as a 140 Hz signal. The spectrum of the signal at the output of the modulator 12 varies as shown schematically in FIG. 2 and thus comprises the above-mentioned 140 Hz signal as well as several components in response to the signalling signals, namely the components of 0 Hz, 10 Hz and multiples of 10 Hz. The 0 and 10 Hz components have the highest level, whereas those signalling components which have a frequency below 50 Hz have a practically negligible level. From 300 Hz onwards, see the hatched area, a continuous spectrum is present; the spectrum is formed by the speech signals.

The output signal of the modulator 12 is applied to a low-pass filter 13 which has a cut-off frequency between 140 and 300 Hz.

A delta modulator 14 to which sampling pulses are applied with a sampling frequency $F_e$ is connected to the output of this low-pass filter 13. The sampling pulses are produced by the clock generator 15. A uniform delta modulator can be used as the delta modulator, the sampling frequency $F_e$ being, for example, equal to 128 kHz.

The output of the delta modulator 14 is connected to a circuit 16 for converting the delta-modulated signal into a PCM signal, wherein the code words occur at a frequency $F_e/2^n$, n being an integer. When a uniform delta modulator 14 is used this converter 16 is formed by an accumulator accumulating the numbers +1 and −1, which represent the values of the bits in the delta modulation signal, the content of the accumulator being read with a frequency $F_e/2^n$. Each of the code words produced by the accumulator comprises n bits. As shown schematically in FIG. 1, the accumulator is formed by a binary adding device 17, a first input of which is connected to the output of the delta modulator 14. The output of this adding device 17 is connected to the second input of the adding device via a delay circuit 18 and a switching circuit 19. The delay circuit 18 has a time delay T which is equal to $1/F_e$. The switching circuit 19 has two positions, denoted by t and r, respectively. When this circuit is in the position t, then the output of the delay device 18 is connected to the second input of the adding device 17. Short pulses having a frequency $F_e/2^n$, produced by the clock generator 15, move the switching circuit 19 to the position r at suitable instants for reading the accumulator. For a primary FDM group n can be chosen equal to 5, so that the PCM code words occur at a frequency of, for example, 4 kHz, if $F_e$ is chosen equal to 128 kHz.

The PCM signal obtained at the output of the device 16 is applied to a digital filter 20, which may be of any known type. This filter 20 is assumed to have a passband characteristic with a band width of approximately 20 Hz and an intermediate frequency of approximately 140 Hz.

The above-mentioned 140 Hz signal, which is characteristic of the pilot signal, is now obtained in digital form at the output of the digital filter 20. As this pilot signal is a sinusoidal signal having a fixed frequency, the level of the pilot signal can be directly derived from the code words produced by the filter 20. To this end and the output of the filter 20 is connected to the input of a circuit 21 wherein this digital 140 Hz signal is processed. The output signal of this circuit 21 is applied to the input 9 of the comparison circuit 8.

Because the 140 Hz signal produced by the filter 20 is sinusoidal, the circuit 21 can be implemented in a particularly simple manner, namely as a peak value detector.

Figure 3:
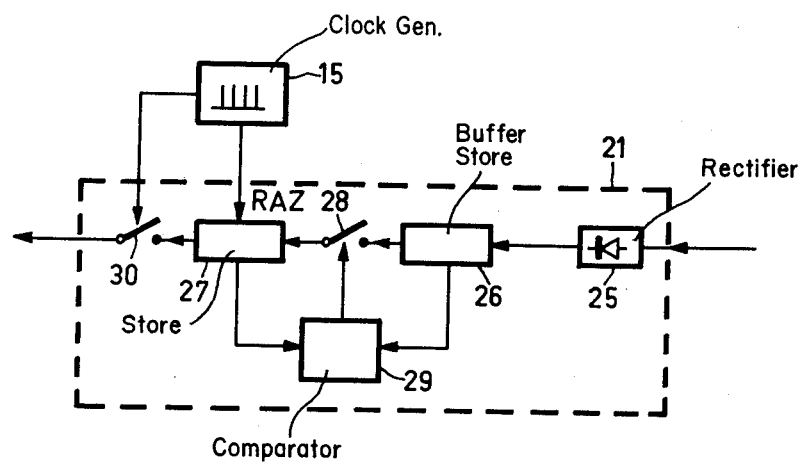
FIG. 3 shows an embodiment of a peak value detector.

The peak value detector can be implemented in the manner as, for example, shown in FIG. 3. The digital input signal of this detector is applied to a full-wave rectifier 25. Each code word produced by rectifier 25 is applied to a buffer store 26, whose content is transferred to a store 27 via a switching circuit 28. Last-mentioned circuit is controlled by the output signal of a comparison circuit 29 which compares the code word in store 26 with the code word in store 27. The content of the store 27 is periodically reset to zero by pulses RAZ produced by a clock pulse generator 15 and occurring with a period exceeding half the period of the 140 Hz signal. If the code word in the store 26 is longer than the code word in the store 27, the switching circuit 28 is closed and if the code word in the store 26 is shorter or equal to that in the store 27, the switching circuit 28 is opened. At the instants at which the pulses RAZ occur, the store 27 comprises therefore a code word which represents the peak value of the pilot signal. These code words, representing the peak value are read from the store 27 by means of a sampling circuit 30 controlled by pulses which are also produced by the clock pulse generator 15 and occur at instants just prior to the occurrence of the pulses RAZ.

What is claimed is:

1. A level control arrangement for controlling the level of a frequency-division multiplex signal which includes a pilot signal, the level control arrangement comprising an amplifier having an adjustable gain factor and having means responsive to a setting signal for adjusting the gain factor thereof, setting signal-generating means coupled to the output of said amplifier and comprising:
= frequency transposition means for transposing the frequency range of the multiplex signal to lower the frequency of the pilot signal;
= a low-pass filter which has its input coupled to the output of the frequency transposition means;
= converting means for converting an analog signal into a digital signal, the input of the converting means being connected to the output of said low-pass filter;
= digital filter means, having an input connected to the output of the converting means, for generating a digital output signal which is characteristic of said pilot signal; and
= means for comparing the peak value of the output of the digital filter means with a reference level to produce the setting signal for application to the amplifier;

which level control arrangement is characterized in that said converting means comprise:

a delta modulator for generating a delta-modulation signal, the delta modulator being controlled by sampling pulses occuring with a sampling rate Fe and which has its input connected to the output of the low-pass filter; and means for converting the delta-modulation signal into a permuted signal whose code words occur with a frequency $Fe/2^n$, n representing an integer.

2. A level control arrangement as claimed in claim 1, characterized in that the delta modulator is formed by a uniform delta modulator and the means for converting the delta modulation signal into the permuted signal is formed by an accumulator whose content is read at a rate $Fe/2^n$.

* * * * *

UNITED STATES PATENT AND TRADEMARK OFFICE
CERTIFICATE OF CORRECTION

PATENT NO. : 4,281,408
DATED : 7/28/81
INVENTOR(S) : GEORGES BONNEROT

It is certified that error appears in the above—identified patent and that said Letters Patent is hereby corrected as shown below:

On the Title Page under Assignee , change item (73) to read --Telecommunications Radioelectriques et Telephoniques T.R.T. Paris, France--.

Signed and Sealed this

First Day of March 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,281,408
DATED : July 28, 1981
INVENTOR(S) : GEORGES BONNEROT

It is certified that error appears in the above—identified patent and that said Letters Patent is hereby corrected as shown below:

Column 6, line 38 after "signal" insert --(that is to say a PCM or DPCM signal)--;

Signed and Sealed this

Fourteenth Day of June 1983

[SEAL]

Attest:

DONALD J. QUIGG

Attesting Officer

Acting Commissioner of Patents and Trademarks